United States Patent [19]

Maklad

[11] 4,231,774
[45] Nov. 4, 1980

[54] METHOD OF FABRICATING LARGE OPTICAL PREFORMS

[75] Inventor: Mokhtar S. Maklad, Roanoke, Va.

[73] Assignee: International Telephone and Telegraph Corporation, New York, N.Y.

[21] Appl. No.: 894,792

[22] Filed: Apr. 10, 1978

[51] Int. Cl.³ .................... C03B 37/025; C03B 37/075
[52] U.S. Cl. ...................................... 65/3 A; 427/163
[58] Field of Search .................. 65/DIG. 7, 3 A, 121, 65/32; 264/1, 81; 427/163, 167; 118/730, 723

[56] References Cited

U.S. PATENT DOCUMENTS

| | | | |
|---|---|---|---|
| 3,303,115 | 2/1967 | Nitsche | 65/3 A X |
| 3,957,474 | 5/1976 | Kobayashi et al. | 65/DIG. 7 |
| 4,017,288 | 4/1977 | French et al. | 65/DIG. 7 |
| 4,050,408 | 9/1977 | Beucherie | 118/723 |
| 4,062,665 | 12/1977 | Izawa et al. | 65/DIG. 7 |
| 4,135,901 | 1/1979 | Fujiwara et al. | 65/3 A X |

*Primary Examiner*—Richard V. Fisher
*Attorney, Agent, or Firm*—John T. O'Halloran; Peter C. Van Der Sluys

[57] ABSTRACT

A large optical preform is fabricated by rotating a platform about its axis while advancing the platform away from a series of nozzles. Each nozzle is arranged to generate an annular ring associated with the preform by a vapor phase oxidation technique. The vapor content introduced by each nozzle is tailored to provide a large diameter optical preform possessing step index, single mode or graded index capabilities. The preform thus produced is then drawn into elongated optical fiber cables having the above described properties.

8 Claims, 4 Drawing Figures

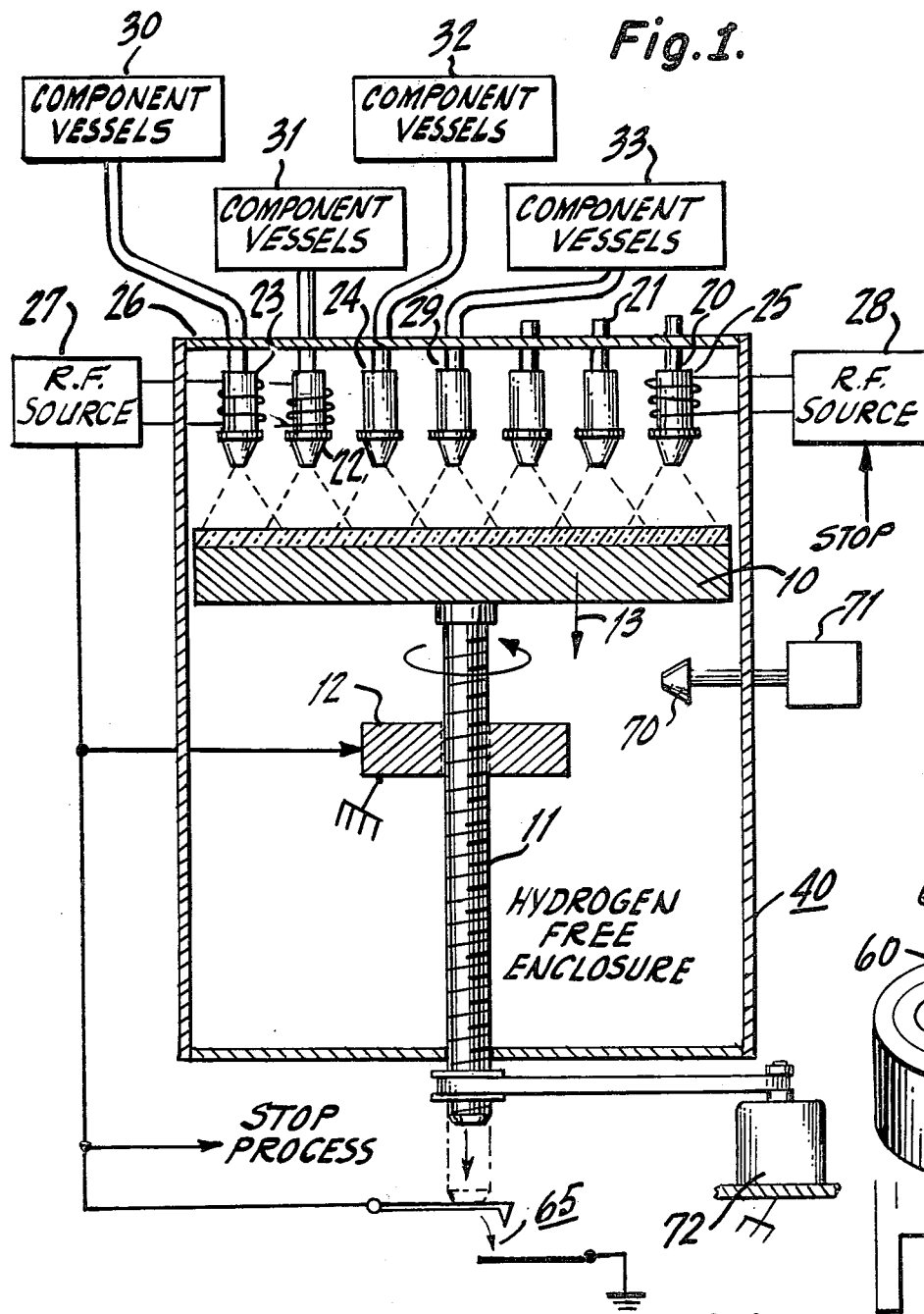
Fig. 1.
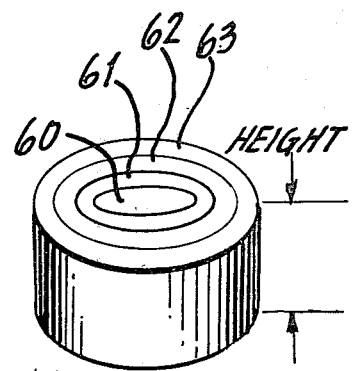
Fig. 2.
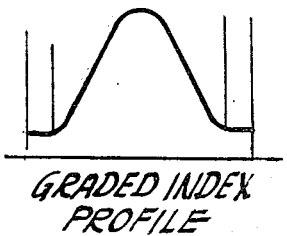
Fig. 3. STEP INDEX PROFILE
Fig. 4. GRADED INDEX PROFILE

METHOD OF FABRICATING LARGE OPTICAL PREFORMS

BACKGROUND OF THE INVENTION

This invention relates to an improved process for forming large optical performs for the production of optical fibers. The process provides large diameter optical preforms which are made to possess step index, single mode or graded index profiles. Such characteristics enable the production of optical fiber cables exhibiting reliable operating characteristics.

There has been a continuous search in the prior art for the economical and mass production of fiber optic cables for use in optical communications systems.

Thus, the prior art considered and describes techniques as "soot" deposition or hydrolysis wherein a gas vapor mixture is hydrolyzed by a flame to form a glass precursor particulate. The particulate is then deposited on a rotating glass rod serving as a mandrel. The soot is deposited upon the mandrel in a perpendicular direction to provide successive layers of constant radius or to provide preforms with radial graduations by varying the dopant concentration in successive passes of the burner flame. The mandrel is removed and a cylindrical preform is collapsed to a solid rod and then drawn into a fiber. This process is shown and discussed in U.S. Pat. No. 3,826,560 and U.S. Pat. No. 3,823,995.

Other techniques as in U.S. Pat. No. 3,614,197 describe processes for continuously forming a fiber optic cable by using a multi-stepped funnel-shaped vessel to form a solid glass rod which is then heated and drawn into a cable.

In any event, there is a desire to provide a solid optical preform and then draw or process the same into a fiber optic cable. Both the continuous process and the preform approach have inherent benefits in the mass production of such cables.

Hence, U.S. Pat. No. 3,966,446 entitled AXIAL FABRICATION OF OPTICAL FIBERS issued on June 24, 1976 discusses a technique for providing an optical preform. The optical preform is fabricated by the axial deposition from a direction along the preformed axis as opposed to radial deposition from a direction perpendicular to the preformed axis. The technique does not require a mandrel and thus avoids the collapse of a cylindrical preform prior to drawing.

The preforms thus provided in the above noted patent possess longitudinal gradations in the index of refraction and thus serve to enhance certain types of mode conversions.

In any event, there is a need to provide large optical preforms which then can be drawn into elongated optical fiber cables. There is a further need to provide an optical preform which can exhibit step, single mode or graded index profiles to enable the resultant cable to be used to more efficiently transmit optical information in the form of digital or other signals.

It is known that fiber cables which possess a single mode of operation alleviate mode dispersion problems. It has been a problem to produce reliable cables employing single mode operation in that the prior art techniques could not adequately control the composition of the cable. Thus, many cables employ a multi-mode operation in using radial gradations in the index of refraction. In these cables the difference in velocity from mode to mode compensates for the different path lengths and results in a relatively equal transversal time for all modes.

In any event, it is clear that in order to efficiently employ a single mode or a multi-mode operation, one must carefully and accurately control the fabrication of the cable to assure that the same is consistent in formulation and hence, possesses repeatable and reliable operating characteristics.

BRIEF DESCRIPTION OF PREFERRED EMBODIMENT

A process for manufacturing an optical preform includes the step of rotating and advancing a base member about an axis relatively transverse to its flat surface, depositing by a vapor phase oxidation process a pattern of concentric glass rings unto said base member to form said preform at a height determined by said advancement of said base member. The process employs a series of nozzles which are positioned above and across the base member as rotated. The nozzles are controlled to provide the large optical preform which possesses a concentric pattern of glass composition layers. Other techniques involve the formation of such preforms which can be drawn to produce fiber optic cables possessing step index, single mode or graded index profiles.

BRIEF DESCRIPTION OF THE DRAWINGS

FIG. 1 is a sectional view of a typical apparatus used in a preform making process according to this invention.

FIG. 2 is a perspective view of a typical preform fabricated from the apparatus of FIG. 1.

FIG. 3 is a diagram depicting a step index profile obtainable with a preform as shown in FIG. 2.

FIG. 4 is a diagram depicting a graded index profile also available with preforms fabricated according to this invention.

DETAILED DESCRIPTION OF THE INVENTION

Referring to FIG. 1, there is shown a rotatable flat platform 10. The platform 10 may be fabricated from a high temperature resistant substance such as a suitable glass, ceramic or other material with high temperature properties. Platform 10 may be circular in shape or possess any other geometrical form enabling the same to be efficiently rotated about its axis.

The platform 10 is coupled to a control shaft 11. As shown in FIG. 1, the control shaft 11 has a threaded surface consisting of a predetermined threaded pattern and is directed through a nut 12 and the shaft 11 is power driven with a motor. As can be seen, the rotating platform associated with a conventional and well known drive system, serves to rotate the platform 10 via the control shaft 11. As the platform rotates, it moves downwardly in the direction of arrow 13.

Located at the same distance above the platform is a series of nozzles as 20, 21, 22, 23, 24. The nozzles are arranged across the platform 10. Each nozzle as 20 is associated with a heat source such as a plasma torch or an intense laser beam such as a carbon dioxide laser beam.

The nozzles may be associated with an RF coil as 25 associated with nozzle 20, coil 26 associated with nozzle 23 and so on. The coils are conventionally coupled to a typical RF driving source as sources 27 and 28.

Each nozzle is coupled to a suitable component vessel as 30 to 33 through a suitable delivery tube. As will be explained, the component vessels contain the necessary materials in order to produce a vapor phase at the nozzle which serves to deposit a glassy layer on the substrate associated with the rotating platform 10. Since each nozzle is coupled to a separate component vessel, the composition at each nozzle may be varied from nozzle to nozzle to thus provide a varying pattern on the substrate and hence, provide preforms which possess a desired profile according to the composition deposited by each of the nozzles.

The entire nozzle assembly and platform 10 and associated drive mechanism is enclosed in a vessel 40. The vessel 40 represents a hydrogen-free environment as it is necessary to suppress the OH absorption in the preforms.

As indicated in FIG. 1, as the platform and substrate is rotated, it moves along the direction of arrow 13. The control shaft advances according to the pitch of the thread associated with the shaft 11 and the rotating speed. During rotation of the substrate in the hydrogen-free environment, a glassy layer is deposited by the nozzles to form a concentric pattern of glass rings as shown in FIG. 2. For example, the central core of the preform shown in FIG. 2 as 60 may be fabricated by nozzle 29. In essence, the vessel 33 coupled to nozzle 29 may contain components enabling the deposition of a relatively pure silicate glass with higher refractive index, thus providing a central core 60 which has relatively low losses. The operation of the nozzles serves to provide a coaxial or annular pattern shown in FIG. 2 as 60 to 63 by way of example.

The height of the preform is a function of the advancement of the control shaft during the fabrication process. The deposition rate and rate of preform advancement have to be synchronized to produce a steady state condition. When the control shaft advances a predetermined amount, it may actuate a switch 65 which as indicated, will terminate the process by inactivating the RF sources for example, the nozzle assembly and shaft rotation. In this manner, a preform as shown in FIG. 2 is formed of a desired height.

The process briefly described above has a high efficiency and high deposition rate due to the operation of the nozzles and the vapor phase oxidation technique to be described. The preform as shown in FIG. 2 may be of a diameter of twelve inches and as such, enables one to draw a long low loss fiber on a continuous basis by the use of the large preform. The drawing process is well known and can be accommodated by the heating of the preform and drawing it through a suitable furnace. The drawing process can be implemented in more than one step to provide an elongated cable of a relatively small diameter.

As indicated above, each nozzle can provide a completely different composition to thus produce a graded index profile as shown in FIG. 4. The composition in each nozzle is made constant with time. The substrate is continuously moving away from the heat sources associated with the nozzles at the same rate at which the preform is being grown. This, of course, is determined by the pitch of the thread associated with shaft 11 and the rotating speed. In this manner, one can produce a step index profile as shown in FIG. 3 by assuring that the growth rate of the preform and the rate of travel of the platform 10 are compatible as indicated above.

The above indicated technique uses a vapor phase deposition and thus permits rapid deposition of glass material in conjunction with the use of an RF glow discharge. The use of a localized RF field in conjunction with the nozzles can result in material deposition at rapid speeds. Each nozzles, as indicated, introduced the preform making materials in gaseous form and impressed the same upon the surface of the platform and substrate 10. The vapor emanating from each nozzle, when excited by the RF coil is rapidly pyrolysed, oxidized and deposited on the substrate 10 in a series of concentric glass layers as 60 to 63 of FIG. 2.

It is understood that the number of nozzles can vary and hence, the number of rings as shown in FIG. 2 can vary accordingly. In the embodiment shown for example, the nozzle 23 and its associated component vessel 30 contributes to the first layer or outer layer 63 of the preform. The nozzle as 22 and its associated component vessel 31 would contribute to the formation of layer 62 as shown in FIG. 2. Each nozzle as 23 may be associated with a corresponding nozzle as 20 which are used to insure that the resulting layers as 63 are uniformly and properly distributed about the predetermined area associated with the substrate 10.

As indicated, the entire deposition process takes place in a hydrogen-free environment as defined by vessel 40. In this manner, additional elements such as oxygen may be introduced through appropriate nozzles as 70 and contained in a suitable source as 71. The oxygen may be introduced into the vessel 40 to cool the preform and to remove any dust particles from the surface and ensure oxidation during formation of the preform as growth is accomplished during the movement of the control shaft 11.

Due to the fact that the composition of each nozzle can be tailored, it is understood for example, that nozzles 23 and 20 which act for formation of the outer layer 63 of the preform can operate to deposit the silica glass as the outer layer. This glass has a low thermal expansion as compared to the glass layers forming cores 60, 61 and 62. Thus, the outside layer 63 is a relatively high compression layer as compared to the inner layer. This serves to increase the resultant fiber strength and thus serves to provide a high fatigue strength cable.

In any event, the materials contained, in the vapor form, in the appropriate vessels as 30 to 33 for example, can be formulated and arranged according to any predesired characteristic which is associated with the resultant preform. Hence, a layer such as 61 may provide a low refractive index as compared to layer 60 which may provide an optical cladding layer. Suitable materials for forming the preform are provided by halides of the desired materials since halides can be readily transported with a carrier gas such as oxygen.

A substance as silicon tetrachloride is entrained within oxygen so that the mixture when introduced via a nozzle, will form a glow discharge under the influence of an RF field as for example, supplied by coil 25 and generator 28. This technique will produce a layer as 63 for example consisting essentially of silica. When boron trichloride and silicon tetrachloride vapors are entrained with oxygen, a layer of borosilicate glass is formed. In a similar manner, one may use germanium and silicon tetrachloride vapor to produce a layer of germania silicate glass. The choice of the chemical vapor deposition avoids losses due to absorption caused by hydroxyl and transistional metal impurities. The use of the controlled environmental enclosure 40 assures that airborne particles and hydrogen compounds will not be present in the preform as it is being fabricated.

RF excitation is used to efficiently deposit the glass components unto the surface of the rotating substrate 10 without the use of auxiliary electrodes.

As above indicated, efficient layers may be deposited by the use of a plasma torch which will also produce high deposition rates.

It is thus seen that one can fabricate a preform as shown in FIG. 2 which in essence comprises an annular composite member having rings thereof gradually varying in composition according to the materials introduced into the associated nozzle forming the ring. In this manner, the composition profile across the preform can be tailored to produce a step index, single mode or graded index as explained. Hence, the technique lends itself to both the production of single mode fibers as well as fibers which possess radial gradations in index of refraction and strictly as a function of the composition introduced via the associated nozzles.

What is claimed is:

1. A process for manufacturing an annular optical preform of a large diameter and of a predetermined height of the type capable of being drawn into an optical fiber, comprising the steps of:

rotating a high temperature resistant flat base member about its center, positioning a first nozzle a predetermined distance above the center of said base member, generating an RF field at the location of said first nozzle for depositing a pyrolysed central core of glass by a vapor oxidation process on said rotating base member via said nozzle, positioning a second nozzle adjacent said first and to the right and a third nozzle adjacent said first and to the left, both at said predetermined distance, generating an RF field at the location of said second and third nozzles for depositing by a vapor oxidation process a pyrolysed first annular glass ring about said core on said rotating base member, positioning a fourth and a fifth nozzle with said fourth nozzle adjacent and to the right of said second nozzle and said fifth nozzle adjacent and to the left of said third nozzle each at said predetermined distance, generating an RF field at the location of said fourth and fifth nozzles for depositing by a vapor oxidation process a pyrolysed second annular glass ring about said first ring and on said rotating base member, advancing said rotating base member away from said nozzle position at a rate determined by the growth of said central core and annular rings to form a preform whose height increases as said base member advances, with the surface of said preform being parallel to the flat surface of said base member and, ceasing the steps of rotating, advancing and generating said RF fields, when said preform attains said predetermined height.

2. The process according to claim 1 wherein said preform has a step index profile.

3. The process according to claim 1 wherein said preform has a graded index profile.

4. The process according to claim 1 further including the step of drawing said preform into an optical fiber.

5. The process according to claim 1 wherein said steps are accommodated in a hydrogen-free environment.

6. The process according to claim 1 wherein the composition of glass deposited by each nozzle is relatively constant with time.

7. The process according to claim 1 further comprising the step of:

introducing an oxygen containing gas unto the surface of said preform to remove impurities and ensure oxidation during formation of the preform.

8. The process according to claim 1 wherein each of said glass rings is fabricated from a different glass whereby said preform exhibits a radial graduation in index of refraction.

* * * * *